United States Patent
Barton et al.

(10) Patent No.: US 6,171,374 B1
(45) Date of Patent: Jan. 9, 2001

(54) PLATE AND FRAME FLUID EXCHANGING ASSEMBLY WITH UNITARY PLATES AND SEALS

(75) Inventors: Russell H. Barton, New Westminster; Brian Wells; Joel A. Ronne, both of Vancouver, all of (CA)

(73) Assignee: Ballard Power Systems Inc., Burnabay (CA)

( * ) Notice: Under 35 U.S.C. 154(b), the term of this patent shall be extended for 0 days.

(21) Appl. No.: 09/321,408

(22) Filed: May 27, 1999

Related U.S. Application Data

(60) Provisional application No. 60/087,276, filed on May 29, 1998.

(51) Int. Cl.[7] .................................................. B01D 53/22
(52) U.S. Cl. .................. 96/7; 96/11; 95/52; 210/321.75; 429/26; 429/37
(58) Field of Search .................. 95/52; 96/4, 7, 96/9, 11; 210/321.75, 321.84; 429/26, 37, 120, 152

(56) References Cited

U.S. PATENT DOCUMENTS

| | | | |
|---|---|---|---|
| 2,618,357 | * 11/1952 | Harlow | 96/7 |
| 3,397,791 | * 8/1968 | Johnson | 210/321.75 |
| 3,501,010 | * 3/1970 | Critchell et al. | 210/321.75 |
| 3,520,803 | * 7/1970 | Iaconelli | 96/7 X |
| 3,735,559 | * 5/1973 | Salemme | 96/9 X |
| 3,854,904 | * 12/1974 | Jamet | 96/7 |
| 3,898,102 | 8/1975 | Louis et al. | 136/86 D |
| 3,930,814 | * 1/1976 | Gessher | 96/9 X |
| 3,973,934 | * 8/1976 | Nierenberg | 96/7 |
| 4,062,778 | * 12/1977 | Riede | 210/321.75 |
| 4,110,220 | * 8/1978 | Lavender | 210/321.75 |
| 4,239,728 | * 12/1980 | Stenberg | 96/7 X |
| 5,225,080 | * 7/1993 | Karbachsch et al. | 96/4 X |
| 5,269,917 | * 12/1993 | Stankowski | 210/321.75 X |
| 5,824,217 | * 10/1998 | Pearl et al. | 210/321.75 |
| 5,891,222 | * 4/1999 | Hilgendorff et al. | 96/11 X |
| 6,048,383 | * 4/2000 | Breault et al. | 96/7 X |

FOREIGN PATENT DOCUMENTS

| | | |
|---|---|---|
| 0 774 794 A1 | 5/1997 | (EP) . |
| 56-044003 | * 4/1981 | (JP) .......... 96/9 |
| 61-278328 | * 12/1986 | (JP) .......... 96/11 |
| 63-028423 | * 2/1988 | (JP) .......... 96/7 |
| 1-027620 | * 1/1989 | (JP) .......... 96/9 |
| WO 94/25995 | 11/1994 | (WO) . |
| WO 97/24778 | 7/1997 | (WO) . |

* cited by examiner

*Primary Examiner*—Robert H. Spitzer
(74) *Attorney, Agent, or Firm*—McAndrews, Held & Malloy, Ltd.

(57) ABSTRACT

An improved plate-and-frame assembly selectively transfers a fluid component from one fluid stream to another fluid stream. In a preferred embodiment, a plate-and-frame humidity exchanger with unitary plates and seals transfers water vapor and heat between two fluid streams.

44 Claims, 2 Drawing Sheets

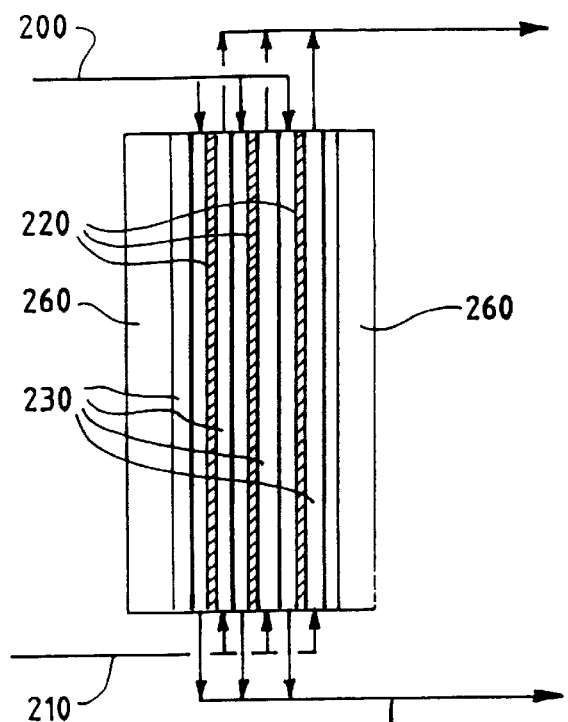
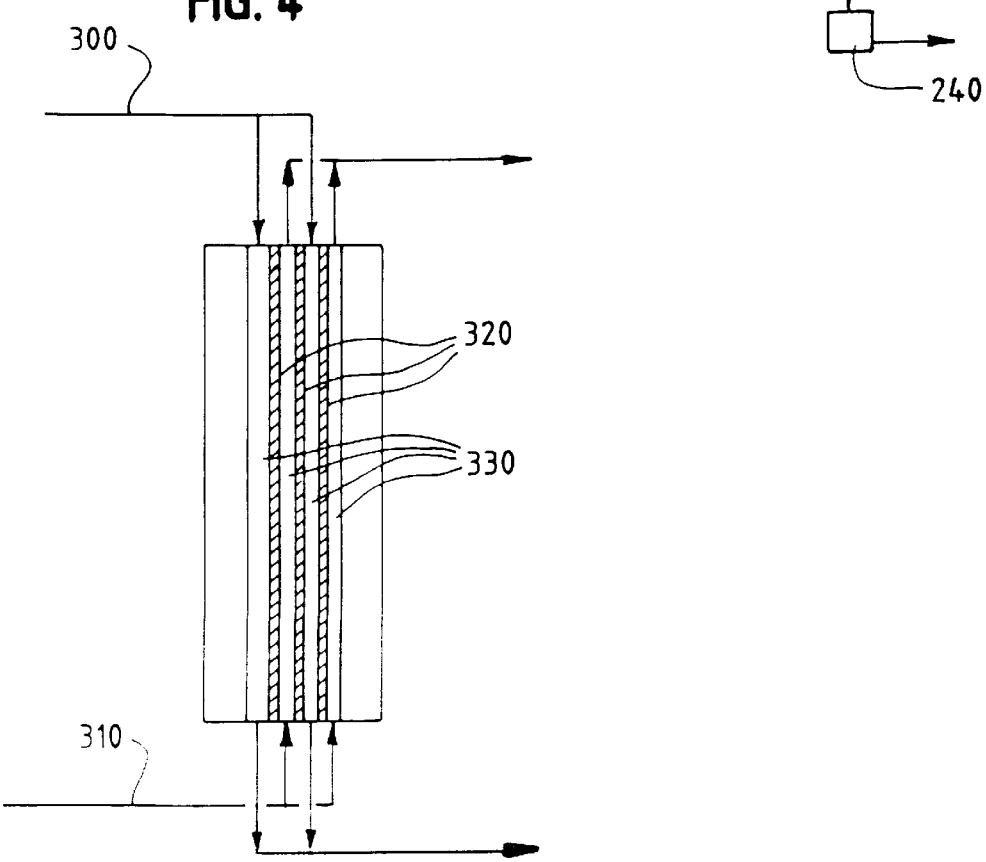

PLATE AND FRAME FLUID EXCHANGING ASSEMBLY WITH UNITARY PLATES AND SEALS

CROSS-REFERENCE TO RELATED APPLICATION

This application is related to and claims priority benefits from U.S. Provisional Patent Application Ser. No. 60/087,276 filed May 29, 1998, entitled "Plate And Frame Fluid Exchanging Assembly With Unitary Plates And Seals". The '276 provisional application is incorporated herein by reference in its entirety.

FIELD OF THE INVENTION

The present invention provides a plate-and-frame assembly for selectively transferring a fluid component from one fluid stream to another fluid stream. More particularly, the preferred embodiment of the invention is a plate-and-frame humidity exchanger with unitary plates and seals for transferring water vapor and heat between two fluid streams.

BACKGROUND OF THE INVENTION

Conventional plate-and-frame assemblies, including humidity exchangers, are modeled after other well known devices such as heat exchangers and fuel cells which also use a plate-and-frame design. In conventional plate-and-frame assemblies a plurality of rigid plates are aligned one on top of another to form a stack of plates. The rigid plates can be made from different materials, depending upon the application and factors such as the operating environment, and weight, size and cost constraints. For some applications, the rigid plates are made from metal whereas in other applications the plates are made from rigid plastic or composites comprising resins and fibers. For example, conventional plate-and-frame heat exchangers typically use rigid metal plates to fluidly isolate two different fluids, but heat is conducted through the rigid metal plates to transfer heat from one fluid to another fluid. Heat exchangers which use metal plates typically use gasket seals made from soft deformable materials such as cork or rubber to provide fluid tight seals between the plates.

Plate-and-frame fluid exchanging assemblies are different from conventional heat exchangers. For example, plate-and-frame fluid exchanging assemblies may be used for exchanging water vapor between two fluid streams. A barrier which separates the two fluid streams must be selectively permeable to water vapor. Plate-and-frame humidity exchangers commonly use substantially impermeable rigid plates with open-faced fluid channels formed therein and a membrane interposed between the plates. The membrane is selectively permeable to water vapor so that water vapor in a humid fluid stream may be transferred through the membrane to a less humid fluid stream. Because the membrane is selectively permeable it serves as a separator which prevents fluid components other than water from being transferred between the two fluids.

To increase the capacity of a plate-and-frame humidity exchanger the useful surface area of the membrane may be increased. One method of increasing the membrane surface area is to use a plurality of rigid plates and membranes stacked one on top of the other for increased membrane surface area. In a stack arrangement, it is well known to provide each plate with openings which align with openings in adjacent plates to form internal fluid manifolds for distributing fluids to and from fluid channels associated with each of the plates in a stack. With conventional sealed plate-and-frame assemblies compliant gaskets are used around manifold openings and perimeter edges of each rigid plate to prevent fluid leakage and to also prevent different fluid streams from mixing with each other within the stack. The gaskets are conventionally made from materials which are softer than the rigid plate materials and the membrane. Gasket materials are substantially impermeable to the fluids which are to be flowing through the plate-and-frame assembly. Unlike rigid plate materials which are structural elements, conventional gasket materials do not contribute to the structural framework of humidity exchangers. Accordingly, conventional gaskets used for humidity exchangers may be made from deformable materials such as, for example, elastomers.

The gaskets may be pre-formed by known methods and placed between the rigid plates and membranes during assembly of the stack. The rigid plates are typically formed with a depression for receiving the gasket and holding it in position. A problem with gaskets is that it is labor intensive to position the gaskets between each rigid plate and membrane during assembly. There may also be leakage problems with a gasket seal if the gasket is misaligned. For example, gasket misalignment could be caused by applying the compressive force to the stack unevenly.

An application for plate-and-frame humidity exchangers is for use in conjunction with solid polymer fuel cells, namely for transferring water vapor from the oxidant exhaust stream to at least one of the reactant supply streams. Solid polymer fuel cells employ an ion exchange membrane such as a proton exchange membrane as the electrolyte. The water content of the fuel cell membrane typically affects the ion conductivity of the fuel cell membrane. The proton conductivity of a fuel cell membrane generally increases as the water content or hydration of the fuel cell membrane increases, therefore it is desirable to maintain a sufficiently high level of hydration in the fuel cell membrane. If the fuel cell membrane becomes dehydrated, the reduction in ion conductivity may result in cell reversal and the generation of heat, both of which may cause permanent damage to the fuel cell components. Accordingly, it is necessary to manage the moisture content of the fuel cell membrane to prevent damage to the fuel cell components and to maintain the performance level of the fuel cell.

The ability of reactant gases to absorb water vapor varies significantly with changes in temperature and pressure. Therefore, it is preferred to humidify the gaseous reactant supply streams at or as near as possible to the operating temperature and pressure in the fuel cell. If the reactant gas is humidified at a temperature higher than the fuel cell operating temperature this can result in condensation of liquid water occurring when the humidified reactant gas enters the fuel cell. Condensation may cause flooding in the electrodes which can detrimentally affect fuel cell performance. Conversely, if the reactant gas stream is humidified at a temperature lower than the fuel cell operating temperature, the reduced water vapor content in the reactant gas stream could result in membrane dehydration and damage to the membrane. Thus, the reactant streams are often heated prior to introduction into the fuel cell.

The reactant streams exiting the fuel cell or fuel cell stack typically contain product water, as well as water vapor which was present in the humidified stream delivered to the fuel cell. In particular, as the oxidant stream travels through a fuel cell, it absorbs water that is produced as the product of the electrochemical reaction at the cathode.

Accordingly, because of the benefits associated with humidifying the reactant supply streams and the water present in the exhaust streams, it is desirable to recover the water present in at least one of the exhaust streams to humidify at least one of the reactant supply streams. For example, it is desirable to provide an improved humidity exchanger for transferring water vapor from the oxidant exhaust stream to the oxidant supply stream, wherein such improvements contribute to ease of assembly and reductions in the cost of production compared to conventional plate-and-frame humidity exchangers which use rigid plates and gasket seals.

SUMMARY OF THE INVENTION

A plate-and-frame fluid exchanging assembly includes unitary plates and seals. The plate-and-frame assembly comprises:

(a) a first resilient plate with a major surface having a fluid passage formed therein;

(b) a second resilient plate with a major surface having a fluid passage formed therein;

(c) a membrane layer interposed between the major surface of each one of the first and second resilient plates, wherein at least a portion of the membrane layer is selectively permeable to at least one selected fluid component for transferring the at least one selected fluid component from a first fluid stream to a second fluid stream when the first and second fluid streams are on opposite sides of the membrane layer;

(d) a first fluid supply port for supplying the first fluid stream to the fluid passage formed in the major surface of the first resilient plate;

(e) a second fluid supply port for supplying the second fluid stream to the fluid passage formed in the major surface of the second resilient plate;

(f) a first fluid exhaust port for removing the first fluid stream from the fluid passage formed in the major surface of the first resilient plate;

(g) a second fluid exhaust port for removing the second fluid stream from the fluid passage formed in the major surface of the second resilient plate; and (h) a compression mechanism for maintaining a compressive load on the plate-and-frame assembly to provide fluid tight seals between each of the first and second plates and the membrane layer.

The first and second resilient plates cooperate with the membrane layer to provide a fluid tight seal therebetween. Unlike the prior art conventional plate-and-frame assemblies which use separate compliant seals placed between rigid plates, in the present improved plate-and-frame assembly, the seals are integral to the unitary plate and seals such that the plates themselves provide the resilient sealing surfaces.

In one embodiment of the plate-and-frame fluid exchanging assembly, the resilient plates are made from a material which has a Durometer hardness measurement of between 25A and 85A on the Shores scale. More preferably, this hardness measurement is between 50A and 80A on the Shores scale. The plate material may be selected from elastomers which have hardness properties within the aforesaid ranges.

In the preferred embodiment for a humidity exchanger, the selected fluid component is water vapor, and at least a portion of the membrane layer is selectively permeable to water vapor. For example, the membrane layer may be made from a cellulose material or a material like perfluorosulfonic acid. The membrane layer may also comprise a frame element around the periphery of the membrane layer. The present improved plate-and-frame fluid exchanging assembly may also operate as a heat exchanger if the fluid streams on opposite sides of the membrane layer have different temperatures.

To increase the membrane surface area, in one embodiment, the plate-and-frame assembly may further comprise a plurality of the first and second resilient plates with a plurality of the membrane layers interposed therebetween, wherein each one of the plurality of first and second resilient plates has opposing first and second major surfaces with fluid passages formed in both of the first and second major surfaces. A plurality of plates and membrane layers arranged in this way form what is commonly known as a "stack" of plate-and-frame assemblies.

In a stack of plate-and-frame assemblies the plurality of first and second resilient plates may be substantially the same (i.e. the first and second plates may be formed using the same molds). In the alternative, the first resilient plates may be molded differently from the second resilient plates, if for example, different first and second plates will improve the performance or durability of the plate-and-frame assembly.

In one embodiment the first and second resilient plates are substantially the same. The resilient plates have at least one fluid passage for the first fluid stream formed in the first major surface of the plate, and at least one fluid passage for the second fluid stream formed in a second major surface of the plate. The fluid passage provided for the first fluid stream may be different from the fluid passage provided for the second fluid stream. For example the fluid passages on one major surface of the plates may be deeper than the fluid passages on the opposite major surface to accommodate differences between the characteristics of the two fluid streams.

The resilient plates provide an impermeable barrier isolating the first and second fluid streams from each other. A membrane layer is interposed between adjacent plates so that the first fluid stream and the second fluid stream are in contact with opposite sides of the membrane layer. The first major surface of each one of the plates is molded with a continuous sealing ridge formed in the sealing areas and the second major surface of each one of plates is molded with a sealing depression for receiving the sealing ridge on the first major surface of the adjacent plate. The sealing areas include the area adjacent the perimeter of each of the major surfaces of each plate and the areas around openings in the plates, for example, around internal fluid supply and exhaust manifolds.

In another embodiment, each one of the plurality of first resilient plates distributes the first fluid stream to fluid passages on both of the first and second major surfaces of the first resilient plate, and each one of the plurality of second resilient plates distributes the second fluid stream to fluid passages on both of the first and second major surfaces of the second resilient plate. A membrane layer is interposed between each adjacent pair of first and second plates such that said first fluid stream is in contact with one side of the membrane layer and the second fluid stream is in contact with the opposite side of the membrane layer. In this embodiment, the first and second plates may be the same or different. For example, the shape or size of the flow passages may be molded differently for the first and second plates. If the plates are different, then the first plates could be molded with sealing ridges on the sealing surfaces on both of the first plate's major surfaces and the second plates could be molded with sealing depressions on the sealing surfaces on both of the second plate's major surfaces. An advantage of this arrangement is that the plates can be oriented with either major surface facing up or down.

In the preferred embodiment, the stack of plate-and-frame assemblies incorporates internal manifolds within the stack for supplying and exhausting the first and second fluid streams to and from respective supply and exhaust ports for each one of the plate-and-frame assemblies. For example, each plate-and-frame assembly in the stack has four separate ports, with each one connecting a different one of the fluid manifolds to a fluid passage associated with one of the plates. That is, a first supply port is for supplying the first fluid stream to a fluid passage in the first major surface of the plate and a second supply port is for supplying the second fluid stream of a fluid passage in the second major surface of the plate. A first exhaust port is for exhausting the first fluid stream from the fluid passage in the first major surface of the plate and a second exhaust port is for exhausting a second exhaust stream from the fluid passage in the second major surface of the plate. The plates and membrane layers are formed with openings which are aligned with corresponding openings in adjacent plates and membrane layers such that the aligned openings collectively form the internal manifolds.

The ports which connect the manifolds to the fluid passages on the major surfaces of the plates may be ports which are molded into the plates themselves. Alternatively, the ports may be formed by an opening between a depression formed in the resilient plates and a manifold insert which spans the depression. The manifold insert prevents the port from being impinged or closed by the compressive force which is applied to the stack. The insert also provides a sealing surface for pressing against the membrane layer to maintain a fluid tight seal. Preferably the insert is made from a rigid material. For example, the insert may be made from a thermoplastic material. However, the insert may also be made from a resilient material as long as the insert does not deflect so as to compromise the integrity of the sealing surfaces when the insert is subjected to the compressive stack forces. For example, for a resilient insert the material preferably has a Durometer hardness measurement which is substantially greater than 100A on the Shore scale. Deflection of the insert where it spans the depression in the plate may cause fluid leakage in the sealing area between the insert and the membrane layer and/or impingement of the underlying port.

To reduce the likelihood of deflection of the manifold insert and/or the resilient plate, the plate or the insert may be made with a supporting member at an intermediate point in the span across the depression area. The supporting member may also act as a fluid divider for dividing the fluid into more than one fluid passage thereby helping to distribute the fluid more evenly across the major surface of the plate.

The fluid passage of each major surface of the resilient plates may comprise a plurality of fluid channels with different channels for directing the respective fluid stream to different regions of the major surface. In one embodiment the channels are parallel and substantially linear. In the preferred embodiment, the fluid channels are vertically oriented for improved drainage of excess water. The excess water may be removed from the exhaust manifolds by a drain system which removes only the liquid water from the exhaust fluid streams.

The channels for each major surface direct the fluid stream from a fluid supply port to a fluid exhaust port. The major surface of the plates may be provided with a plurality of channels, and in this embodiment the channels may be separated by divider walls. The divider walls also provide support to prevent deflection or deformation of the membrane layer. In the preferred embodiment, the divider walls associated with the major surfaces of plates on opposite sides of a membrane layer do not entirely overlap, thus avoiding the potential for subjecting the thin membrane layer to damaging shear forces. In one embodiment the divider walls on opposing major surfaces have shallow alternating bends which are arranged so that the opposite divider walls cross each other at specific points while the majority of divider walls are non-overlapping.

In the preferred embodiment, the first and second supply manifolds and ports are located on opposite ends of the respective fluid channels such that the first and second fluid streams travel in substantially opposite directions (i.e. counter-current flow).

The preferred embodiment of the improved plate-and-frame fluid exchanging assembly includes a compression mechanism having at least two rigid compression plates for evenly distributing a compressive force to the plate-and-frame assembly. In a stack, the plate-and-frame assembly comprises a plurality of resilient plates and membrane layers which are interposed between the compression plates. The compression plate may further comprise fluid passages for supplying and exhausting fluids to and from respective internal supply and exhaust manifolds.

In addition to the compression plates, the compression assembly further comprises a means for maintaining a compressive load on the plate-and-frame assembly, including a tension member spanning from one compression plate to the other compression plate. It will be understood by those skilled in the art that there are many means suitable for maintaining the compressive load such as, for example, tie rods (i.e. tension members) and springs for keeping the stack in compression and the tie rods in tension, or rigid compression bands instead of tie rods, or elastic compression bands installed in tension in substitution for both the tension members and the springs.

A method of manufacturing a resilient plate for a plate-and-frame assembly with integral seals comprises the steps of:
 (a) providing a mold for forming the plate wherein the mold provides fluid channels on a major surface of the plate and integral sealing areas;
 (b) injecting a resilient material suitable for sealing into the mold; and
 (c) removing the plate from the mold.

Preferably, the resilient material is an elastomer. The elastomeric material may be a thermosetting or a thermoplastic material which has a hardness which is suitable for sealing (i.e. between 25A and 85A on the Shore scale).

A method for assembling a plate-and-frame fluid exchanging assembly having unitary plates and seals comprises the following sequential steps:
 (a) providing a first compression plate;
 (b) positioning a major surface of a first resilient plate on top of the first compression plate;
 (c) positioning a membrane layer on top of the resilient plate;
 (d) positioning a major surface of a second resilient plate on top of the membrane layer;
 (e) repeating steps (b) and (c) with successive alternating membrane and resilient plate layers until the desired number of layers is stacked on top of the first compression plate;
 (f) positioning a second compression plate on top of the resilient plates and membrane layers, thereby completing a stack arrangement of humidity exchanger assemblies; and (g) applying a compressing force to the stack and maintaining the compressive force using a compression mechanism.

For plate-and-frame assemblies which employ manifold inserts, four manifold inserts are inserted between each pair of resilient plates with two inserts positioned on each side of the membrane layer. Before step (c), the two manifold inserts associated with the supply and exhaust manifolds and ports serving the first resilient plate are positioned next to the first resilient plate. After step (c), the two manifold inserts associated with the supply and exhaust manifolds and ports serving the second resilient plate are positioned next to the major surface of the second resilient plate facing the first resilient plate and the membrane layer before performing step (d).

Brief Description Of The Drawings

FIG. 3 is a schematic illustration of a preferred embodiment of a stack of plate-and-frame assemblies employing three membrane layers and resilient separator plates with different fluids supplied to opposite sides of the plates.

FIG. 4 is a schematic illustration of an embodiment of a stack of plate-and-frame assemblies employing three membrane layers and resilient plates with the same fluid supplied to opposite sides of the plates.

DETAILED DESCRIPTION OF THE PREFERRED EMBODIMENTS

Figure 1:
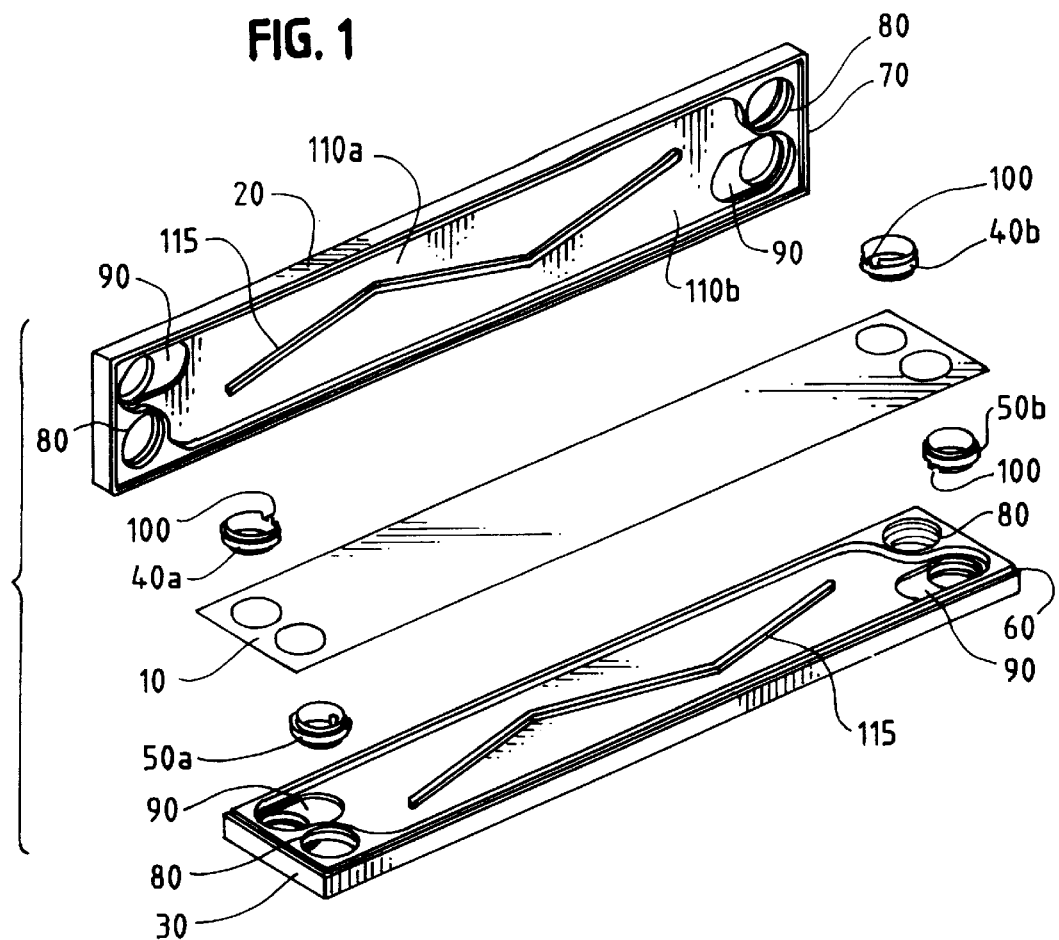
FIG. 1 is an exploded perspective view of a preferred embodiment of the improved plate-and-frame assembly showing a plate-and-frame assembly which incorporates manifold inserts.

FIG. 1 depicts an exploded view of an embodiment of an improved plate-and-frame assembly. Membrane layer 10 is interposed between resilient plate 20 and resilient plate 30. Manifold inserts 40a and 40b are interposed between membrane layer 10 and plate 20. Manifold inserts 50a and 50b are interposed between membrane layer 10 and plate 30. In an assembled plate-and-frame assembly all of the aforementioned components 10 through 50b are pressed into contact with adjacent components to provide fluid tight sealing. FIG. 1 does not show the compression mechanism which maintains a compressive load on the components of the plate-and-frame assembly.

Continuous sealing depression 60 circumscribes the perimeter of a major surface of plate 30. Sealing ridge 70 circumscribes the perimeter of a major surface of plate 20. Sealing depression 60 is shaped to receive sealing ridge 70 when plates 20 and 30 are pressed against each other by the compressive load. Membrane layer 10 is pressed between sealing ridge 70 and sealing depression 60.

The openings in plates 20 and 30 are aligned with openings in membrane layer 10, and when these components are all stacked one on top of the other, the openings form internal fluid manifolds for supplying and exhausting fluid streams to and from plates 20 and 30. Sealing ridges 80 are provided around the openings in plates 20 and 30 to prevent fluid streams from leaking out of the manifolds. Depressions 90 are provided at predetermined locations next to the fluid manifold openings so that the fluid streams in the manifolds can be supplied to the fluid passages on the plate surfaces and vice versa. Inserts 40a, 40b, 50a and 50b provide bridge members which span across depressions 90. Thus a manifold port is formed between depression 90 and each of inserts 40a, 40b, 50a and 50b which also each provide a sealing surface which is pressed against membrane layer 10 when the components are assembled. The bridge members of inserts 40a, 40b, 50a, and 50b may further comprise intermediate supports 100 for preventing impingement of the manifold port openings and dividing the fluid streams.

The fluid passages formed in the major surfaces of plates 20 and 30 may be arranged as separate channels to more evenly distribute the respective fluid streams to the entire exposed surface of membrane layer 10. For example, FIG. 1 shows plate 20 with its major surface divided into two channels 110a and 110b. Divider wall 115 separates parallel channels 110a and 110b.

Because divider wall 115 is pressed against membrane layer 10, divider wall 115 is made to reduce the potential for causing damage to membrane layer 10. Membrane layer 10 is particularly susceptible to damage because it is typically very thin. It is desirable to reduce the thickness of membrane layer 10 to improve its selective permeability to the selected fluid component. However, reducing the thickness of membrane layer 10 also weakens its structural resistance to shear forces. Divider wall 115 is provided with shallow bends in alternating directions. As shown in FIG. 1, divider wall 115 meanders while maintaining a substantially linear fluid flow direction in channels 110a and 110b. In the embodiment illustrated in FIG. 1, the shallow bends in the divider wall 115 of plate 20 are opposite to the direction of the shallow bends of plate 30. The divider walls on opposite sides of membrane layer 10 preferably do not align although they may overlap where the divider walls cross over each other. It is believed that the non-linear and non-aligned divider walls reduce the shear forces which divider walls 115 may potentially apply to the thin membrane layer when the components are compressed.

Figure 2:
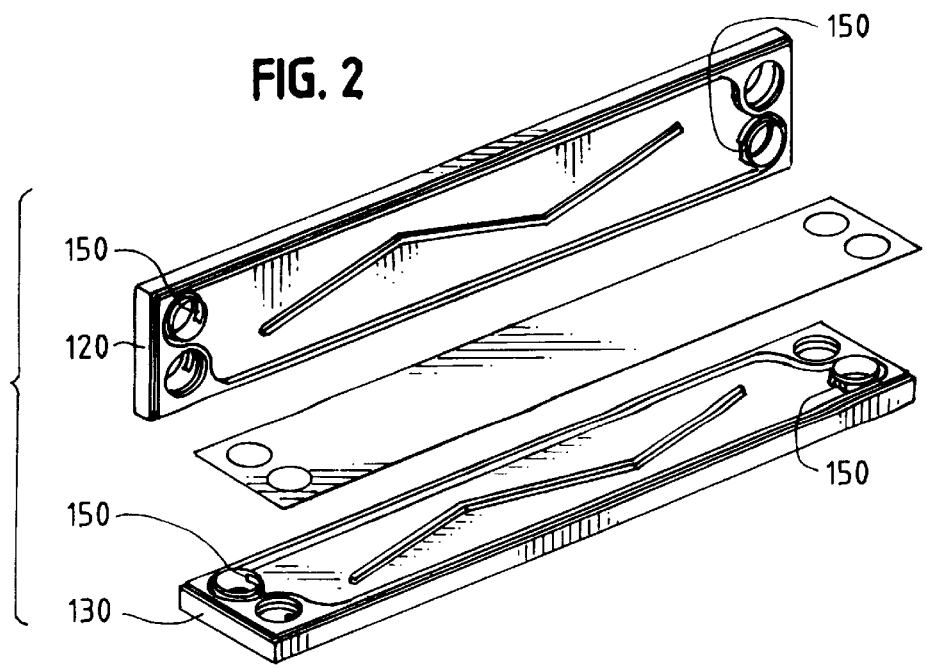
FIG. 2 is an exploded perspective view of an embodiment of the improved plate-and-frame assembly showing a plate-and-frame assembly which incorporates supply and exhaust ports molded into the resilient plates.

FIG. 2 depicts an exploded view of another embodiment of the improved plate-and-frame assembly which has a membrane layer interposed between plates 120 and 130. Plates 120 and 130 employ manifold ports 150 which may be molded into plates 120 and 130. Molded manifold ports 150 may be molded into plates 120 and 130 at the same time the plates themselves are molded. Alternatively, manifold ports may be made after plates 120 and 130 have been molded. Accordingly, the plate-and-frame assembly of FIG. 2 does not need bridge members or manifold inserts.

The plate-and-frame assemblies illustrated in FIGS. 1 and 2 may be stacked with other plate-and-frame assemblies to increase the capacity of the device by increasing the membrane surface area which is exposed to the fluid streams. In the preferred embodiment fluid channels 110a and 110b are formed on both sides of plates 20 and 30 so that fluid streams may be directed to both major surfaces of plates 20 and 30. A plurality of plates may then be stacked one on top of the other with membrane layers and inserts interposed therebetween in the same way in which these components are assembled for a single assembly. For example, with reference to FIG. 1, in this embodiment, plate 20 has two major surfaces with additional fluid channels provided on the major surface of plate 20 opposite to the major surface which is shown. The additional fluid channels would be the same as the channels shown on plate 30. Similarly, additional fluid channels would be provided on the major surface of plate 30 opposite to the major surface which is shown, and these additional channels would be the same as fluid channels 110a and 110b of plate 20.

The stacked arrangement is further explained with reference to FIG. 3 which schematically shows how two fluid supply streams 200 and 210 are supplied to a plate-and-frame assembly which employs three membrane layers 220 interposed between four plates 230. Membrane layers 220 and plates 230 are shown in end view (i.e. the major surfaces of these components are not shown). A solid line in the middle of plates 230 represents how plates 230 are divided into two halves with different fluid streams flowing on opposite sides of plates 230. Fluid streams 200 and 210 are directed to respective fluid channels formed in the major surfaces of plates 230. Fluid streams 200 and 210 are separated by plates 230 and membrane layers 220. The membrane layers are selectively permeable to allow the transfer of a selected fluid component and/or heat from, for example, fluid stream 200 to fluid stream 210. The fluid channels are vertically oriented with fluid stream 200 entering the plate-and-frame assembly from the top and flowing downwards. Fluid stream 210 enters the plate-and-frame assembly from the bottom and flows upwards. Accordingly, in the embodiment shown by FIG. 3, fluid streams 200 and 210 flow in generally opposite directions.

A drain 240 may be provided for recovering condensed water from an exhaust stream. Drain 240 is sealed to prevent gaseous components from exiting through the drain. Liquid water recovered by drain 240 may be used as a coolant or saved in a reservoir for other purposes such as additional humidification of the fluid streams.

FIG. 3 also shows how the stack of plate-and-frame assemblies are interposed between two compression plates 260.

FIG. 4 is a schematic diagram of another embodiment of the improved plate-and-frame assembly wherein two fluid streams 300 and 310 are supplied to a stack of plate-and-frame assemblies comprising three membrane layers 320 are interposed between four plates 330. Only one of fluid streams 300 and 310 is supplied to each one of plates 330. Plates 330 have fluid passages which direct the same fluid stream to both of the plate's major surfaces. In this embodiment, plates 330 need not act as separator plates. Accordingly, plates 330 shown in FIG. 4 are not divided by a solid line like plates 230 shown in FIG. 3.

The present improved plate-and-frame assembly is particularly well suited for applications such as exchanging water vapor between two fluid streams. Because fuel cells benefit from having humidified reactant supply streams, and fuel cells also exhaust fluid streams which contain water vapor, a fuel cell provides a particularly useful application for a humidity exchanger with the features of the present improved plate-and-frame assembly. For example, the oxidant exhaust stream is heated and humidified by the electrochemical reactions which take place within the fuel cell. The oxidant exhaust stream therefore has approximately the same temperature as the internal temperature within the fuel cell. It is desirable to heat the reactant supply streams to the temperature within the fuel cell. Accordingly, it is beneficial to use the oxidant exhaust stream to contribute to heating and humidifying at least one of the reactant supply streams. The present improved plate-and-frame assembly can be made from materials which are suitable for contact with the reactant supply streams and the fuel cell exhaust streams. Excess water which has condensed within the oxidant exhaust stream may be recovered and immediately used as cooling water for cooling the fuel cell. Alternatively, the water may be saved in a reservoir for later use as a coolant or to humidify one of the reactant supply streams. Another advantage of using a plate-and-frame humidity exchanger with a fuel cell stack is that the humidity exchanger assembly can share the same compression mechanism which is used to compress the fuel cell which may also be a plate-and-frame device (i.e. the same compression plates may be laid over the ends of a fuel cell stack and a humidity exchanger stack).

While one particular application for the present invention has been described, namely a plate-and-frame humidity exchanger, it will be understood by those skilled in the art that the invention may also be used for other applications which use a membrane layer to exchange or separate fluid components between two fluid streams. For example, the present invention will also have utility for other applications including osmotic separators such as those used for artificial kidneys.

Therefore, while particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A plate-and-frame fluid exchanging assembly with unitary plates and seals, said assembly comprising:
    (a) a first resilient plate with a major surface having a fluid passage formed therein;
    (b) a second resilient plate with a major surface having a fluid passage formed therein;
    (c) a membrane layer interposed between said major surface of each one of said first and second resilient plates, wherein said membrane layer is selectively permeable to at least one selected fluid component for transferring said at least one selected fluid component from a first fluid stream to a second fluid stream when said first and second fluid streams are on opposite sides of said membrane layer;
    (d) a first fluid supply port for supplying said first fluid stream to said fluid passage formed in said major surface of said first resilient plate;
    (e) a second fluid supply port for supplying said second fluid stream to said fluid passage formed in said major surface of said second resilient plate;
    (f) a first fluid exhaust port for removing said first fluid stream from said fluid passage formed in said major surface of said first resilient plate;
    (g) a second fluid exhaust port for removing said second fluid stream from said fluid passage formed in said major surface of said second resilient plate; and
    (h) a compression mechanism for compressing said plate-and-frame assembly; wherein said first and second plates are resilient and cooperate with said membrane layer to provide a fluid tight seal therebetween.

2. The plate-and-frame fluid exchanging assembly of claim 1 wherein said first and second resilient plates have a Durometer hardness measurement of between 25A and 85A on the Shore scale.

3. The plate-and-frame fluid exchanging assembly of claim 1 wherein said first and second resilient plates have a Durometer hardness measurement of between 50A and 80A on the Shore scale.

4. The plate-and-frame fluid exchanging assembly of claim 1 wherein said first and second resilient plates are made from an elastomer.

5. The plate-and-frame fluid exchanging assembly of claim 1 wherein said at least one selected fluid component is water vapor, and said membrane layer is selectively permeable to water vapor.

6. The plate-and-frame fluid exchanging assembly of claim 5 wherein said assembly further comprises a plurality of said first and second resilient plates with a plurality of said membrane layers interposed therebetween, wherein each one of said plurality of first and second resilient plates has opposing first and second major surfaces with fluid passages formed in both first and second major surfaces, said plurality of plates and membrane layers forming a stack of plate-and-frame assemblies.

7. The stack of plate-and-frame assemblies of claim 6 wherein each one of said plurality of first and second resilient plates is identical to other ones of said plurality.

8. The stack of plate-and-frame assemblies of claim 7 wherein said resilient plates have said first and second fluid streams within respective said fluid passages on opposing major surfaces of said resilient plates and said resilient plates provide an impermeable barrier segregating said first and second fluid streams from each other.

9. The plate-and-frame fluid exchanging assembly of claim 7 wherein said first major surface of each one of said resilient plates is formed with a male sealing surface which fits into a corresponding female sealing surface formed in said second major surface of each one of said resilient plates.

10. The plate-and-frame fluid exchanging assembly of claim 9 wherein said sealing surfaces circumscribe said major surfaces of said resilient plates.

11. The plate-and-frame fluid exchanging assembly of claim 9 further comprising sealing surfaces circumscribing fluid manifolds which pass through said resilient plates and membrane layers, wherein said sealing surfaces comprise resilient ridges formed in said resilient plates.

12. The stack of plate-and-frame assemblies of claim 6 wherein each of said plurality of first resilient plates distributes said first fluid stream to fluid passages on both of said first and second major surfaces of said first resilient plate, and each of said plurality of second resilient plates distributes said second fluid stream to fluid passages on both of said first and second major surfaces of said second resilient plate.

13. The plate-and-frame fluid exchanging assembly of claim 12 wherein said first and second major surfaces of each one of said first resilient plates is formed with a male sealing surface which fits into a corresponding female sealing surface formed in said first and second major surfaces of each one of said second resilient plates.

14. The plate-and-frame fluid exchanging assembly of claim 13 wherein said sealing surfaces circumscribe said respective major surfaces of said first and second resilient plates.

15. The plate-and-frame fluid exchanging assembly of claim 13 further comprising sealing surfaces circumscribing fluid manifolds which pass through said resilient plates and membrane layers, wherein said sealing surfaces comprise resilient ridges formed in said first and second resilient plates.

16. The stack of plate-and-frame assemblies of claim 6 wherein said plurality of resilient plates and said membrane layers further comprise openings in said plurality of plates and said membrane layers wherein said openings are aligned such that said openings serve as manifolds within said stack for supplying and exhausting fluid streams to and from said first and second resilient plates through said first and second fluid supply and exhaust ports, respectively.

17. The stack of plate-and-frame assemblies of claim 16 wherein said first and second fluid supply and exhaust ports are molded into said resilient plates, said ports providing fluid passages between said manifolds and said fluid channels.

18. The stack of plate-and-frame assemblies of claim 16 wherein said first and second fluid supply and exhaust ports are formed by an open channel formed in said resilient plates, and a manifold insert which covers said open channel whereby said insert provides a sealing surface against said membrane layer.

19. The stack of plate-and-frame assemblies of claim 18 wherein said manifold insert is a rigid material.

20. The stack of plate-and-frame assemblies of claim 19 wherein said manifold insert is made from a thermoplastic material.

21. The stack of plate-and-frame assemblies of claim 18 wherein said manifold insert has a Durometer hardness measurement of substantially greater than 100A on the Shore scale.

22. The stack of plate-and-frame assemblies of claim 18 wherein said first and second supply fluid manifold inserts provide at least one divider for splitting said open channel into at least two passages for directing said first and second fluids to different flow passages.

23. The plate-and-frame fluid exchanging assembly of claim 1 wherein said compression mechanism comprises at least two rigid compression plates for evenly distributing a compressive force to said plate-and-frame assembly, said first and second resilient plates and said membrane layer being interposed between said compression plates.

24. The plate-and-frame fluid exchanging assembly of claim 23 wherein said compression plates further comprise fluid passages for supplying and exhausting fluids to and from respective supply and exhaust manifolds of said fluid exchanging assembly.

25. The plate-and-frame fluid exchanging assembly of claim 1 wherein said major surface of said first resilient plate is formed with a male sealing surface which fits into a corresponding female sealing surface of said major surface of said second resilient plate.

26. The plate-and-frame fluid exchanging assembly of claim 25 wherein said sealing surfaces circumscribe said major surfaces of said resilient plates.

27. The plate-and-frame fluid exchanging assembly of claim 25 further comprising sealing surfaces circumscribing fluid manifolds which pass through said first and second resilient plates and membrane layers, wherein said male sealing surfaces comprise resilient ridges formed in said first and second resilient plates and said female sealing surfaces comprise depressions formed in said first and second resilient plates.

28. The plate-and-frame fluid exchanging assembly of claim 1 wherein said fluid passages comprise a plurality of fluid channels.

29. The plate-and-frame fluid exchanging assembly of claim 28 wherein said plurality of fluid channels are parallel.

30. The plate-and-frame fluid exchanging assembly of claim 29 wherein said plurality of fluid channels provide a substantially linear flow path from a supply manifold port to an exhaust manifold port.

31. The plate-and-frame fluid exchanging assembly of claim 30 wherein divider walls separate said channels and said divider walls have a plurality of shallow bends alternating in bend direction to maintain said substantially linear flow path.

32. The plate-and-frame fluid exchanging assembly of claim 31 wherein said divider walls of said flow channels on opposing sides of said membrane layer have opposing bends in opposite directions such that said opposing divider walls cross but are not aligned.

33. The plate-and-frame fluid exchanging assembly of claim 30 wherein said fluid channels are vertically oriented with at least one of said first and second fluid streams flowing downwards.

34. The plate-and-frame fluid exchanging assembly of claim 33 further comprising a drain system for draining liquids from at least one of said fluid streams.

35. The plate-and-frame fluid exchanging assembly of claim 1 wherein said first fluid supply port and said second fluid supply port are located on opposite ends of said resilient plates such that said first fluid and said second fluid flow in opposite directions.

36. The plate-and-frame fluid exchanging assembly of claim 1 wherein said first fluid is a reactant exhaust stream received from a fuel cell;

said second fluid is a reactant supply stream for said fuel cell;

and said selected fluid component is water vapor.

37. The plate-and-frame fluid exchanging assembly of claim 36 wherein said assembly as operates as a heat exchanger when there is a temperature differential between said first and second fluid streams.

38. The plate-and-frame fluid exchanging assembly of claim 36 wherein said compression mechanism is integral with a compression mechanism which compresses said fuel cell.

39. The plate-and-frame fluid exchanging assembly of claim 36 wherein said reactant exhaust stream is an oxidant exhaust stream and condensed water in said oxidant exhaust stream is recovered after said oxidant exhaust stream has exited said plate-and-frame assembly and said recovered water is added to a cooling fluid stream used to cool said fuel cell.

40. A method of manufacturing a resilient plate for a plate-and-frame assembly with integral seals comprising the steps of:

(a) providing a mold for forming said plate wherein said mold provides fluid channels on a major surface of said plate and integral sealing areas;

(b) injecting a resilient material into said mold; and (c) removing said plate from said mold.

41. The method of claim 40 wherein said resilient material is a thermosetting material.

42. The method of claim 40 wherein said resilient material is a thermoplastic material.

43. A method for assembling a plate-and-frame fluid exchanging assembly having unitary plates and seals, said method comprising the sequential steps of:

(a) providing down a first compression plate;

(b) positioning a first major surface of a first resilient plate on top of said first compression plate;

(c) positioning a membrane layer on top of said first resilient plate;

(d) positioning a major surface of a second resilient plate on top of said membrane layer;

(e) repeating steps (c) and (d) with successive alternating membrane and resilient plate layers until the desired number of layers is stacked on top of said first compression plate;

(f) positioning a second compression plate on top of said resilient plates and membrane layers, thereby completing a stack arrangement of fluid exchanging assemblies; and (g) applying a compressive force to said stack and maintaining said compressive force using a compression mechanism.

44. The method of claim 43 further comprising the steps of inserting manifold inserts between said first and second resilient plates wherein said manifold inserts associated with supply and exhaust manifolds and ports serving said first resilient plate are inserted into said first resilient plate before step (c) and manifold inserts associated with supply and exhaust manifolds and ports serving said second resilient plate are inserted into said second resilient plate after step (c).

* * * * *